United States Patent

[11] 3,582,651

[72] Inventor Melvin P. Siedband
Baltimore, Md.
[21] Appl. No. 754,546
[22] Filed Aug. 22, 1968
[45] Patented June 1, 1971
[73] Assignee Westinghouse Electric Corporation,
Pittsburgh, Pa.

[54] X-RAY IMAGE STORAGE, REPRODUCTION AND COMPARISON SYSTEM
13 Claims, 1 Drawing Fig.

[52] U.S. Cl. ............................................ 250/93, 65; 178/7.8, 17.5; 346/74
[51] Int. Cl. ............................................ G03b 41/16
[50] Field of Search .................................... 250/65, 93; 178/7.8, 17.5; 346/74

[56] References Cited
UNITED STATES PATENTS
3,432,657 3/1969 Slavin .................... 250/53

*Primary Examiner*—Archie R. Borchelt
*Assistant Examiner*—A. L. Birch
*Attorney*—F. H. Henson, C. F. Renz and A. S. Oddi

ABSTRACT: An image storage and display system is disclosed primarily intended to be used with X-ray apparatus. An X-ray image is scanned by a television recorder and recorded on a continuous loop recording media such as a magnetic disk. Synchronizing signals are pre-recorded on the recording media and are utilized for controlling the scanning operation of the television camera. The system may be operated in a plurality of modes including:

(1) A stop action mode wherein a frame of the X-ray image is recorded and then may be continuously played back.

(2) An image enhancement mode wherein a previously recorded image is compared with a real time image presently being scanned by the television camera to enhance particular portions of the image.

(3) An energy comparison mode wherein an X-ray image taken at a first energy level is recorded and compared with a real time X-ray image being taken at a second energy level.

(4) An intermittent slide mode wherein X-ray images are sequentially recorded and played back with the image display being intermittently changed. All of the above modes of operation are effected in full synchronization under the control of the synchronizing signals recorded on the recording media.

PATENTED JUN 1 1971 3,582,651
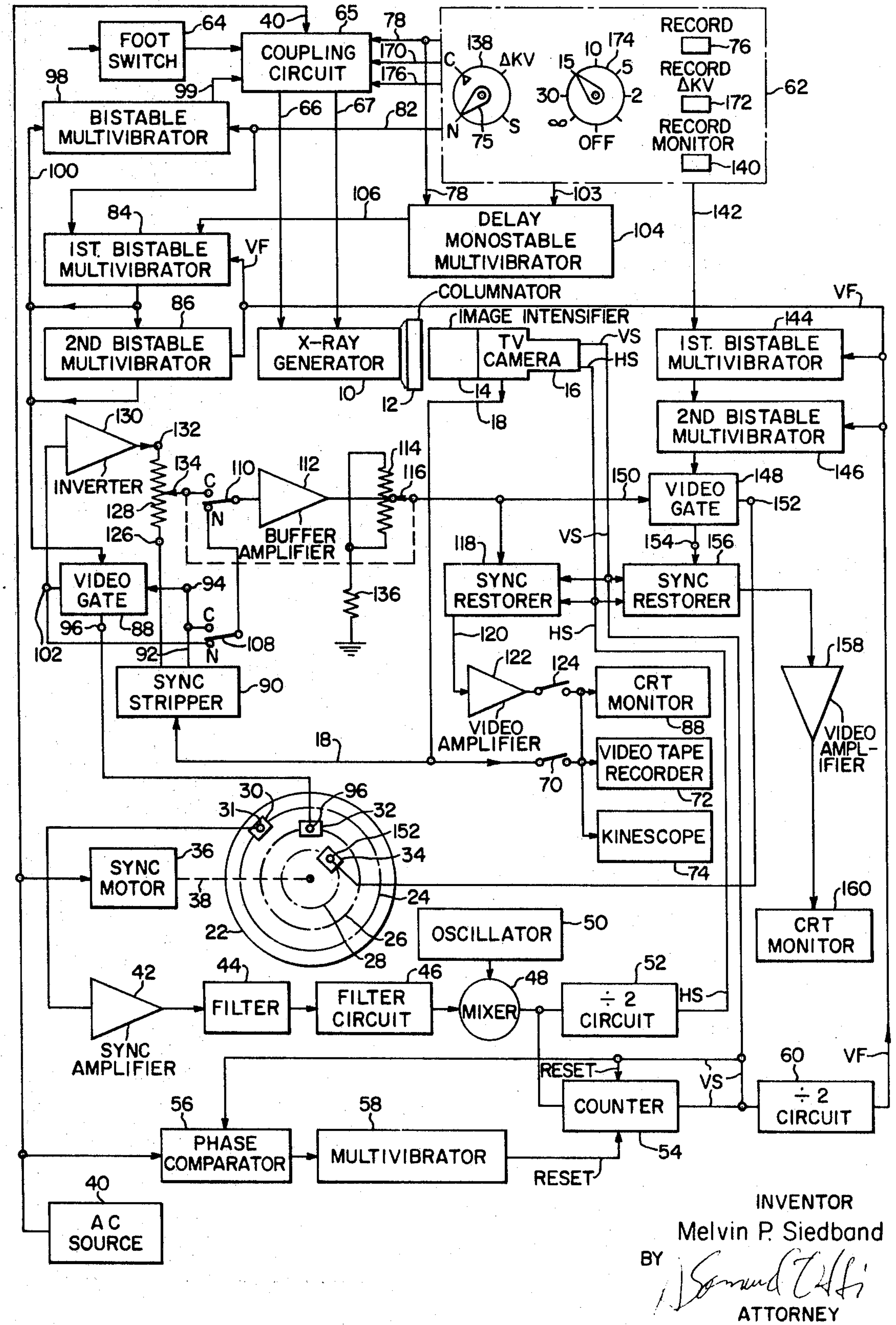
INVENTOR
Melvin P. Siedband
BY [signature]
ATTORNEY

X-RAY IMAGE STORAGE, REPRODUCTION AND COMPARISON SYSTEM

BACKGROUND OF THE INVENTION

FIELD OF THE INVENTION

The present invention relates to image recording and display apparatus and, more particularly, to such apparatus operative in a plurality of modes for selectively recording, comparing and displaying various image information.

DESCRIPTION OF THE PRIOR ART

The use of high energy X-ray radiation to examine portions of the anatomy is a well established clinical technique. Typically, the X-rays are directed to the particular portion of the anatomy of the patient under investigation and the X-ray image displayed on a fluoroscopic screen, for example, or a photograph of the image is taken. More recently, a television camera is used to sense the X-ray image displayed on a fluoroscopic screen and convert it to video signals which are applied to a cathode ray tube display. Alternatively, radio isotopes may be inserted intraveneously into the body to provide a source of radiation which is sensed and displayed upon a suitable monitor. In the copending application 496,076, entitled "Radiation Dectors and Methods of Operation Therefor", by E. J. Sternglass, there is described a system for providing a visual display of those portions of the anatomy which have been injected with isotopes. The X-ray or gamma ray sensitive system includes a television camera and an image intensifier which are optically connected to provide an electrical output corresponding to the X-ray image focused upon the image intensifier. As disclosed in U.S. Patent No. 2,550,316, by M. P. Wilder, suitable storage devices such as an electrical-in, electrical-out storage tube may be provided upon which the electrical-signal derived from a television camera device may be stored and repeatedly read out and displayed on a monitor such as a cathode ray tube. Such devices have the advantage that the physician may view the patient's anatomy long after the source of X-rays has been turned off thereby significantly reducing the patient's exposure to possibly dangerous radiation. However, the use of electrical-in, electrical-out storage tubes may prove to be expensive, and additionally, such storage devices sacrifice to a degree the resolution of the video image since they may lack certain means for assuring precise registration of stored and real time images.

In viewing an X-ray image, whether on a photographic negative or as displayed upon a cathode ray tube, it is often difficult to detect slight differences in contrast between portions of the displayed image. The contrast of this display may be enhanced in accordance with a medical examining procedure known as the subtraction technique. In the prior art this was accomplished by taking the X-ray pictures before and after the injection into the patient of an X-ray contrast medium or dye to outline the desired portions of the subject. By photographic process, one of the images is printed as a positive whereas the other image is printed as a negative. The photographic films are superimposed upon each other and a print made of the composite films. The composite print will enhance contrast of the areas outlined by the contrast material which will appear darker or lighter than the grey background. The other portions which are common to both photographs will in effect be cancelled out or reduced to a grey. The difficulties with such a photographic technique include obtaining exact registration between the two prints, obtaining photographic negatives with the correct density, and necessary delays in processing the negatives.

In an attempt to overcome the problems of superimposing two films together, U.S. patent No. 3,283,071, to S. W. Rose et al., suggests the use of two television cameras for viewing each of the photographic prints. The output signal derived from one television camera is reversed from its normal polarity so that it produces a negative image. The electrical output signals derived from the two cameras are combined in a mixer and a composite electrical signal is displayed on a cathode ray tube. In this manner, the intensity and contrast of the video signals may be adjusted to produce a composite picture in which those portions which are not common to both films appear to stand out as either a lighter or darker tone. One of the prime difficulties associated with the use of two cameras is that the electrical storage characteristics vary from camera to camera and the resultant combined image will not be in perfect registration. In addition, it is still required to reproduce photographically prints of the X-ray image which requires time and prevents a real time view of the anatomy under investigation. In addition, the Rose et al. patent suggests that two images may be superimposed upon a single television camera by mirrors. The difficulty with such a system is in the amount of flicker presented upon the television monitor due to the inability of even the better television camera devices to erase rapidly one image and to charge the storage target of the television to a different image. It is also evident that the use of photographic film prevents a real time capability for such a system, and, as a result, the doctor cannot examine a subject while the dye is flowing into the organs or while manipulating the patient to observe special effects.

SUMMARY OF THE INVENTION

Broadly the present invention provides image storing and display apparatus wherein a radiation image is scanned and recorded on a recording medium which also has recorded thereon synchronizing information which is utilized to control the scan of the image. The apparatus is operative in a plurality of modes including continuously viewing a single image, intermittently viewing different images in sequence and comparing previously recorded images with a real time image to enhance the resultant image or to compare different images taken at different energy levels. This system is entirely synchronized by the synchronizing signals which, moreover may be utilized to control the radiation used for generating the image to hold this radiation to a minimum.

DESCRIPTION OF THE DRAWING

The single figure is a schematic-block diagram of the image storage and display system of the present invention as incorporated into an X-ray system.

DESCRIPTION OF THE PREFERRED EMBODIMENT

Referring to the figure, the system as shown is capable of operating in at least four different modes designated herein as:

(1) Stop Action Mode;
(2) Contrast Enhancement Mode;
(3) Energy Comparison Mode; and
(4) Intermittent Slide Mode.

Before the various modes of operation are described the synchronization of the system will be discussed.

SYNCHRONIZATION

Referring to the drawing, an X-ray generator 10 is provided which includes an X-ray tube for focusing X-rays upon a particular portion of the patient under examination. The high energy X-rays are variously absorbed by the anatomy of the patient and a corresponding image is directed onto a collimator or X-ray grid 12 which restricts the X-ray image to be formed by direct rather than scattered X-ray photons in order to achieve the best image contrast on an X-ray image intensifier 14, which converts the X-ray image formed thereon to a corresponding electron image which is intensified by acceleration to relatively high potentials to be applied to the output screen of the image intensifier 12. The output screen converts the electron image into a corresponding optical image which is optically coupled to a television camera 16. The television camera 16 scans the optical image under the control of horizontal synchronizing signals HS and vertical synchronizing signals VS to provide a composite video output at its output 18 which corresponds to the original X-ray image.

In order to record the composite video output of the television camera 16, it is necessary that the recording process be synchronized with the scanning of the television camera 16. In order to accomplish the synchronism of the recording process and the television scanning operation a sync system is provided for generating the horizontal and vertical sync signals HS and VS, respectively. The sync signals HS and VS are generated in response to a pre-recorded synchronizing track recorded on the recording media itself.

In the present system, the continuous storage medium utilized may, for example, comprise a magnetic disk recorder which includes a magnetic disk 22. A plurality of continuous tracks may be recorded on the disk 22 and are designated as tracks 24, 26 and 28. These tracks 24, 26 and 28 have associated, respectively, therewith record-playback heads 30, 32 and 34. The disk 22 is driven by a synchronous motor 36 via shaft 38 at a constant speed with the synchronous motor 36 being supplied from an input AC source 40 of the system, which may comprise 120 volts, 60 Hz. source.

The track 24 on the disk 22 comprises the sync track to the system which has recorded thereon a finite number of impulses for one revolution of the disk so that under proper operation a 3.15 MHz. (or other multiple of 2 times the system horizontal frequency) signal is outputed from the record-playback head 30 of the track 24, which will be deisgnated herein as the sync head in response to the pre-recorded impulses on the sync track 24. This pre-recorded sync track 24 is utilized for generating the synchronizing pulses HS and VS which control the scanning of the television camera 16 and thereby insures that the recording of video information on the disk 22 is synchronized with the scanning of the X-ray image by the television camera 16.

The sync pulses VS and HS are generated in the following manner in response to the output of the sync head 30. The signal output appearing at a terminal 31 of the sync head 30 is applied to a sync amplifier 42 which amplifies the level of the signals and applies them to a 3.15 MHz. filter 44, which may, for example, comprise a very high Q filter for providing a high quality 3.15 MHz. signal to a divide by 100 and filter circuit 46, whose output is a 31.5 KHz. sinusoidal wave of relatively high purity. The 31.5 KHz. signal is applied to a mixer 48 which is operated as a stronger signal selection circuit whose other input is from a 31.5 KHz. oscillator 50 which may comprise a crystal oscillator supplying a 31.5 KHz. sinusoidal output continuously or may be the 31.5 KC output of a complete, conventional television sync generator. The mixer 48 selects the stronger of the signal inputs thereto. Normally the system is arranged so that the output of the divide by a 100 and filter circuit 46 is the dominant signal which will normally be outputed from the mixer 48. However, under adverse conditions, for example, if the disk sync output should fail, the 31.5 KHz. signal from the oscillator 50 would be provided at the output of the mixer 48.

The 31.5 KHz. output of the mixer 48 is applied to a divide by 2 circuit 52 whose output is at 15.75 KHz. which supplies the horizontal sync signals HS for controlling the horizontal scanning rate of the television camera 16. The 31.5 KHz. output of the mixer 48 is also applied to a 525 counter 54 which provides an output for each 525 input cycle thereto and then resets itself. The output of the 525 counter is thus at the vertical scanning rate of 60 Hz. thereby providing the vertical sync signals VS which are supplied for controlling the vertical scanning rate of the television camera 16.

In order to insure proper operation in full synchronism between the scanning recording operation it is necessary that generation of the 60 Hz. vertical sync signals VS be in synchronism with the 60 Hz. output of the AC source 40. This is done by applying the output of the AC source 40 to a phase comparator 56 which receives as its other input the vertical sync singals VS from the output of the 525 counter 54. If the AC source and the 525 counter 54 are not in phase with each other, the phase comparator 56 supplies an output to a multivibrator 58 which supplies a reset signal to the counter 54 which resets the counter 54 to start recounting at that instant. In this fashion the counter 54 is reset until the output VS thereof is in substantial synchronism with the AC source 40 output. Under these conditions the phase comparator 56 will not trigger the multivibrator 58 and the counter 54 is permitted to operate under its own reset when 525 cycles of its input are counted. Thus, the vertical sync signals VS are forced to be in synchronism with the AC source 40 and since the disk 22 is driven by a synchronous motor 36 applied from the AC source 40 there will be synchronism throughout the system.

The vertical sync signals VS at the 60 Hz. rate are also applied to a divide by 2 circuit 60 which provides a 30 Hz. output which will be termed herein as vertical framing pulse VF. A vertical framing pulse encompasses two vertical fields of the television scan, that is, one complete television frame. The use of the vertical framing pulses VF will be discussed below. With the synchronizing signals VS and HS being generated in response to a pre-recorded synchronizing track 24 on the disk 22 and with the synchronizing pulses VS and VH being generated in synchronism with the AC source 40, the entire system is in synchronism and recording of the output of the television camera 16 may be commenced and the system may be operated in its various modes. The various modes of operation of the system are controlled via a mode selector indicated generally on the drawing by the reference numeral 62. The various modes of operation will be considered in terms of how a radiologist would perform the various modes of operation via the mode selector 62.

(1) STOP ACTION MODE

This mode of operation is set up by placing an indicator dial 75 of the mode selector 62 in the "N" or normal position. The X-ray generator 10 is activated by the radiologist activating a switch 64 which may for example be a foot switch which is activated by closing. The activation of the foot switch 64 causes the output of the AC source 40 to be applied via a coupling circuit 65 to an output 66 connected to the X-ray generator 10, which in response thereto provides its high voltage, high energy X-ray output. With the foot switch 64 closed, a radiologist may monitor the X-ray image via a monitor 68 which may comprise a cathode ray tube monitor which receives the composite video output 18 of the TV camera 16 via a switch 70. Also the output 18 of the TV camera 16 may be applied to a video tape recorder 72 for the continuous recording of the X-ray image or to a kinescope 74 including a movie or a still recorder. Any of the monitoring or recording mechanisms 68, 72 and 74 may be selectively operated by the radiologist.

If the radiologist desires to record a particular X-ray image on the disk 22, a record button 76 on the mode selector 62 is activated which provides an output 82. In response to the output 82 a first bistable multivibrator 84 is changed from its reset state to its set state and is returned to its reset condition by a vertical frame pulse VF being supplied thereto from the divide by 2 circuit 60 of the synchronizing system. The resetting of the first bistable 84 causes a second bistable multivibrator 86 to be activated to its reset condition, which supplies a gating output to a video gate 88 to activate it. The next video framing pulse VF, which occurs two television field, or one frame later, causes the second bistable 86 to be reset thereby terminating its gating output to the video gate 88 and deactivating the video gate 88 at this time. The first bistable 84 having already been reset remains in its reset state. Thus irrespective of the time at which the record button 76 is depressed in the vertical scanning cycle of the television camera 16, the logic of the system is such that the bistable multivibrators 84 and 86 permit the video gate 88 to be activated at the beginning of a first field of scan and to remain activated for two complete fields of scan, that is, for one complete frame.

The composite video output 18 of the television camera 16 is supplied to a sync stripper 90 which separates the vertical and horizontal synchronizing pulses from the video information to provide video signals without the synchronizing pulses at the output 92 thereof to be applied to the input terminal 94 of the video gate. During the frame time interval that the video gate 88 is activated, the video signals applied to the input terminal 94 are translated therethrough to a terminal 96 which is connected to the record-playback head 32 associated with the track 26 of the recorder disk 22. The signals from terminal 96 of the video gate 88 are recorded on the track 26 so that one complete frame is recorded about one complete circular track of the disk 22.

A complete frame of video information corresponding to the X-ray image desired by the radiologist is thus stored on the track 26 and will remain there until the radiologist desires to record a different image in place thereof. If a different image is desired to be recorded, the same process would be followed with the prior recorded information being erased as the new video information is recorded on the track 26 from the record-playback head 32. It should be noted that the recorded frame of video information is in exact synchronism with the scan of the television camera 16 in that the original synchronizing information was taken from the pre-recorded track 24 of the disk 22 to use for generating the vertical and horizontal synchronizing pulses VH and HS for the television camera 16.

In normal operation the deactivation of foot switch 64 causes the X-ray generator 10 to be deenergized thereby terminating the X-ray output thereof. However, it is highly desirable that during the recording operation that even if the foot switch 64 were deactivated that the last full frame of the X-ray image be recorded before the X-ray generator 10 may be turned off. This is provided by the logic of the system as shown. The output 82 from the mode selector 62, which is applied to the first bistable multivibrator 84 to instigate the record operation, is also applied to a bistable multivibrator 98, which in response thereto provides a set output 99 which is applied to the coupling circuit 65 to maintain the output 66 to the X-ray generator 10. The reset input for the bistable 98 is supplied from a combined output 100 of the bistables 84 and 86 which are operative to cause the bistable 98 to reset when both of the bistables 84 and 86 are in their reset condition. As previously explained, the bistables 84 and 86 will both be in their reset condition after one full frame of video information has been recorded. Thus, even though the radiologist may release the foot switch 64 while the recording operation is still in process, the bistable 98 will prevent the X-ray generator 10 from being deactivated until the end of the recording operation.

If the X-ray generator 10 has not been previosuly energized by the closing of the foot switch 64 it is possible for the radiologist to record a frame of video information by merely depressing the record button 76 which supplies an output 78 to be applied to the coupling circuit 65. This causes energizing power to be applied immediately to the X-ray generator 10 and to the television camera 16 and associated circuitry so that the equipment may reach the desired operating gain conditions for the camera tube and the X-ray generator. Also, the output 78 from the mode selector 62 is applied to a delay monostable multivibrator 104. The monostable 104 is designed to have the fixed time delay, for example, one frame period of 1/30 of a second, before it supplies an output 106 which is applied to the first bistable 84 to instigate the recording operation. In this manner an automatic delay time is introduced into the system to permit both the X-ray generator 10 and the television camera system to come up to steady-state operating conditions, so that when the recording operation commences the system will be in a condition to provide high quality information for recording on the disk 22.

With the selector dial 75 placed in the "N" or normal state of operation, which is the stop action mode, the system is set up for the playback of the recorded frame corresponding to the X-ray image recorded. The selection of the "N" position of the dial 75 causes a pair of switches 108 and 110 to be set to their normal "N" states as shown. Thus, when playback of the recorded information is instigated the record-playback head 32 for the track 26 picks up the recorded video information, translates it from the terminal 96 of the video gate 88 to terminal 102 of the gate 88, through the switches 108 and 110 to a buffer amplifier 112, wherein the video information is amplified. The output of buffer amplifier 112 is applied to the center tap point of a potentiometer 114, which has its tap 116 connected to a sync restoring circuit 118. The sync storing circuit 118 has applied thereto the vertical and horizontal synchronizing pulses VS and HS from the synchronizing system and restores these pulses to proper location with respect to the video information that has been recorded in the track 26 of the disk 22. The output 120 of the sync restorer 118 is thus the composite video signal that originally appeared at the output 18 of the television camera 16. The output 120 is then amplified in a video amplifier 122 and applied via a switch 124, which is closed when the switch 70 from the television camera 18 is opened, to the CRT monitor 68 for the reproduction of the recorded X-ray image. The stored information on the track 26 will thus be continuously read out by the head 32 for the stop action reproduction of the video information corresponding to the X-ray image previosuly recorded and the radiologist may continuously review this image on the monitor 68 or it may be recorded on recorders 72 or 74 if desired.

If the radiologist desires to record another image the recording operations as described above are repeated with the previously recorded video information being erased as the new video information is inputed. If a multiple track disk recorder is utilized, the new information may be recorded on a different track from the previously recorded one thereby preserving the previously recorded track for future reference if desired. On playback the radiologist can then select the desired track of recorded information for his stop action review of the recorded X-ray images.

(2) CONTRAST ENHANCEMENT MODE

A unique feature of the present system is the ability to compare a stored X-ray image with a real time X-ray image in perfect synchronism. By inverting the stored image and algebraically adding it to a real time image cancellation of the common portions of the image can be effected with the enhancement of the non-common portions being the end result. To accomplish this the selector dial 75 is set at the "C" or comparison mode index thereby causing the switches 108 and 110 to be set in their comparison "C" positions. An X-ray image is then recorded on the disk 22 for example on the track 26 via the record-playback head 32. The X-ray image may for example be that of the head of a patient prior to the application of an X-ray contrast media such as a dye to the blood vessels of the head. This recorded image will show the outline of bone structure of the skull and other common information. At the time of the injection of the X-ray contrast media into the blood vessels, the real time image of this is derived from the TV camera 16 at its output 18 and applied to the sync stripper 90 which separates the synchronizing pulses therefrom to provide a video output at the bottom terminal 126 of a potentiometer 128. The recorded X-ray image is taken from the track 26 and the head 32 via the terminals 96 and 102 of the video gate 88 to be applied to an inverter 130 which inverts the video information to be 180° out of phase with the real time information. The inverted signals are applied to the top terminal 132 of the potentiometer 128. The potentiometer 128 has a movable tap 134 thereof which when set at the center position should provide for maximum cancellation of the common information in the real time and stored signals. In other words, the stored information from the disk 22 is inverted and added to real time information so that the common portions of the signals are cancelled thereby eliminating or substantially attenuating any common information in the two signals such as the bone sturctures and thereby highlighting the blood vessels which have been injected with dye for the better examination of the outlines of the blood vessels.

The tap 134 is connected via the switch 110 in its "C" position through the buffer 112 to the center tap point of the potentiometer 114. The end points of the potentiometer 114 are commonly connected together and then through a resistor 136 to ground. The tap arm 116 of the potentiometer 114 and the tap arm 134 of the potentiometer 128 are mechanically ganged together and are commonly controlled by a contrast control knob 138 of the mode selector 62 for the convenience of the radiologist.

The connection of the potentiometer 114 and the resistor 136 forms a simple video attenuator. The arms 116 and 134 of the respective potentiometers may be conveniently ganged on a common shaft so that the radiologist may easily control the contrast level of the comparison being made between the real time and stored images. The potentiometers 128 and 114 are so arranged to cause maximum video gain to be present at the point where one would expect minimum video signal. In other words, when there is maximum cancellation between the real time and stored images, which would occur in the example with the tap 134 of the potentiometer 128 at its center position, the position of the tap 116 of the potentiometer 114 in the video attenuator is set to provide maximum gain since the output of the potentiometer 128 would normally be at its lowest minimum signal level. Thus the radiologist by adjusting the comparison knob 138 automatically enhances the gain of his video output from the tap arm 116 of the potentiometer 114 as he approaches the maximum cancellation position of the potentiometer 128. Hence, the radiolgist can view subtle differences between the stored and real time images at optimized gain conditions even through normally this should be the minimum signal condition due to the maximum cancellation of the common portions of the stored and real time signals. Moreover, by the adjustment of the comparison knob 138 to set the tap 134 to either end of the potentiometer 128 the radiologist can observe the real time image being produced at that instant in time by the television camera 16 or alternately view the previously stored image, or by adjusting the tap 134 any degree of cancellation between the images therebetween can be viewed to make a complete analysis of the stored and real time images with minimum difficulty.

The difference contrast enhanced video output taken at the tap 116 of the potentiometer 114 is applied to the sync restorer 118 for the restoration of the vertical and horizontal synchronizing pulses VS and HS to the video signals which are then applied via the output 120 to the amplifier 122 for amplification therein. Then via the switch 124 the combined video signals may be displayed on the monitor 68 or recorded in the recorders 72 and 74 as desired.

Another feature of the present system is that the difference signal output at the tap arm 116 may be recorded by the radiologist on a separate track of the disk 22 for further study at a later period of time and with the patient removed from X-ray exposure. Once the radiologist has adjusted the comparison knob 138 to obtain the desired difference signal for recording, he merely depresses a record monitor button 140 on the mode selector 62. This instigates the recording of the then appearing difference signal between the real time image and the previously stored reference image in the following manner.

The activation of the record monitor button 140 causes an output 142 from the mode selector 62 to be applied to a first bistable multivibrator 144 which goes to its set condition. The bistable 144 is reset in response to a vertical frame pulse VF applied thereto from the divide by 2 circuit 60 of the synchronizing system. In response thereto the bistable 144 causes a second bistable 146 to be activated to its set condition thereby providing a gating output to a video gate 148. The second bistable 146 remains in a set condition until the next vertical pulse VF is applied thereto, which causes it to reset terminating the gating output to the video gate 146. Thus, the video gate 148 is operative for one complete frame of the video information. The components 144, 146 and 148 operate in corresponding fashion to the components 84, 86, and 88, previously described. Difference video information at the tap 116 of the potentiometer 114 thus is translated via a connection 150 through the video gate 148 to appear at output terminals 152 and 154 of the video gate 148. The output of terminal 152 is connected to the record-playback head 34 associated with the track 28 of the recording disk 22 with the complete frame of the different video signals being recorded around the track 28 for subsequent reproduction.

When it is desired for the radiologist to playback the information recorded on the track 28, the recorded information is outputed therefrom via the head 34 and applied from the terminals 152 and 154 of the video gate 148 to a sync restorer 156, which has applied thereto the vertical and horizontal synchronizing pulses VS and HS. The composite video output from the sync restorer 156 is applied to a video amplifier 158 and then applied to a CRT monitor 160 for viewing by the radiologist with the recorded difference image being continuously outputed from the track 28 as long as desired.

(3) ENERGY COMPARISON MODE

An important diagnostic technique for a radiologist is the ability to vary the energy level of X-rays applied to a patient under examination since various parts of the anatomy produce an image dependent upon the energy level of X-rays applied thereto. For example, it is known that certain soft tissues differentially absorb X-rays as a function of the X-ray energy. Thus by varying the energy level of the X-ray, these certain soft tissues may be detected. These differences are often subtle, and it would be highly desirable if contrast enhancement could be utilized to present the difference between an X-ray image taken at one energy level with one taken at another energy level. This comparison of the X-ray images taken at different energy levels may be done in the present system by first setting the selection dial 75 in the "N" or normal position and recording a frame of video information corresponding to an X-ray image on the track 26 of the disk 22, for example. This image will be recorded at the normal energy level of the system and may be played back from the track 26 in the normal fashion with the switches 108 and 110 in the "N" or normal position. However, when it is desired to compare the image at the normal energy level with an image taken at a different energy level the indicator dial 75 is set to the ΔKV position as shown on the mode selector 62. In response to the ΔKV setting, the switches 108 and 110 are set to their "C" positions. Also the setting of the dial 75 of the ΔKV position provides an input 170 to be applied to the coupling circuit 65 to set it up to provide an output 67 rather than its normal output 66 when activated by the foot switch 64, for example. The output 67 is applied to the X-ray generator 10 and causes it to have a changed energy output, either higher or lower, but preferably lower, from the normal energy level. This may be accomplished by utilizing tapped transformer windings in the power supply of the X-ray generator 10, for example.

The X-ray image produced at the changed energy level is scanned by the TV camera 16 and outputed at 18 to be applied via the sync stripper 90 to the bottom end terminal 126 of the potentiometer 128. The video information recorded previously at the normal energy level is inverted in the inverter 132 and applied to the tap end terminal 132 of the potentiometer 128. The video signals at the two energy levels are thus algebraically added in the potentiometer 128, as previously described, to provide the difference output at the tap 134 thereof which is amplified in the buffer amplifier 112 and applied to the center point of the potentiometer 114. The difference signal between the images at the different energy levels then may be viewed on the CRT monitor 68 by the radiologist who may control the mixing of the signals via the comparison knob 138, as previously described, to determine any subtle differences between the signals taken at the different energy levels. Also the radiologist, if desired, may record the difference signals by activating a record ΔKV button 172 which will record the difference in signals taken at the different energy levels on the track 28 of the disk 22 in a manner as previously discussed with respect to the activation of the record monitor button 140. With the difference signal being recorded the radiologist may remove the X-rays from the patient under examination and examine difference images at his convenience, without the patient being subjected to excessive radiation.

(4) INTERMITTENT SLIDE MODE

It is of course highly desirable to minimize the amount of radiation perceived by a patient under examination. In the intermittent slide mode of operation of the present system, the amount of radiation received by the patient is minimized by only activating the X-ray generator 10 long enough to record a single frame video information corresponding to the X-ray image desired and then deactivating the X-ray generator for a predetermined length of time while the recorded image is played back for review by the radiologist. Automatically, after a predetermined length of time has expired, the X-ray generator 10 is reactivated to record a new frame of video information corresponding to a new X-ray image which is then recorded with the X-ray generator being deactivated for the predetermined length of time as the recorded image is played back. Thus the radiologist sees a series of different X-ray images on his monitor in a slide fashion with the particular image changing according to setting on the mode selector 62.

In the present system this would be accomplished by setting the indicator 75 on the indicia designated "S" for slide mode and then setting an indicator 174 to the desired rate for changing the X-ray image. For example, a rate of one change of image for each 15 seconds is shown indicated on the mode selector 62. This would mean that the X-ray generator 10 would be activated once every 15 seconds to record a single frame of video information corresponding to the X-ray image at that time with the X-ray generator 10 then being deactivated and the recorded video image corresponding to the X-ray image being played back for the remainder of the time interval. This takes place in the present system in the following manner.

In response to the setting of the indicator 174 an output pulse every 15 seconds is provided from the mode selector 62 via an output 176 to the coupling circuit 65. In response to the pulses, the output 66 is applied to energize the X-ray generator 10 once every 15 seconds. Also an output 103 from the mode selector 62 is supplied to the monostable multivibrator 104 which after a predetermined time delay as discussed previously supplies an output 106 to the first monostable multivibrator 84 to instigate the record action. The delay of the monostable 104 is necessary to permit the X-ray generator and the television camera 16 to reach steady-state conditions before the record operation is instigated. While the control of the first bistable multivibrator 84 and the second multistable multivibrator 86, the video gate 88 is activated for two fields or one complete frame to record the desired frame of video information. The X-ray generator 10 is deactivated in response to the termination of the pulse output 176 each period after the recording of the complete frame on the track 26 of the magnetic disk 22. The recorded information is immediately outputed from the track 26 via the terminals 96 and 102 of the video gate 88 to be applied via the switches 108 and 110, buffer amplifier 112 tap 116 of the potentiometer 114, sync restorer 118 and amplifier 122, to be displayed on the CRT monitor 68 for the observation by the radiologist. This output will remain for a period of time as determined by the setting on the dial 174, in the present example after a 15 second time interval has expired from the beginning of the recording operation. At this time another pulse output at 176 will be supplied with the X-ray generator 10 being activated by an output 66 from the coupling circuit 65. The record operation will again take place as previously described. Immediately after the frame of video information has been recorded, the X-ray generator 10 is deactivated and the record information is outputed from the track 26 to be played back on the monitor 68 until the next X-ray image is to be recorded. In such a manner the radiologist can review the various X-ray images intermittently at the desired rate thereby minimizing the amount of radiation received by the patient and yet permitting sufficient diagnostic time for review of the X-rays. Moreover, the radiologist may terminate the intermittent taking of X-rays and store selected particular frames for more extended observation at a later time.

Although the present invention has been described with a certain degree of particularity, it should be understood that the present disclosure has been made only by way of example and that numerous changes in the details of construction, and the combination arrangement of parts, elements and components can be resorted to without departing from the spirit and scope of the present invention.

I claim as my invention:

1. In a sensing and recording system the combination of:

generating means comprising X-ray generating means for producing radiation images as X-ray images;

scanning means including television camera means for scanning said images and converting them into video signals;

recording means including a continuous loop magnetic media having a plurality of recording tracks thereon, each of said tracks comprising a separate continuous loop, synchronizing generating signals being recorded on one of said tracks;

synchronizing generating means responsive to said synchronizing generation signals for producing the synchronizing signals for controlling the scanning of said scanning means, said synchronizing signals including vertical and horizontal synchronizing signals for controlling the vertical field and horizontal line scanning rates, respectively, of said television camera means;

said synchronizing generating means including means for generating vertical framing signals at the vertical frame rate of said television camera means;

selection means for selectively recording on selected of said recording tracks a predetermined quantity of said video signals comprising a predetermined number of vertical fields of scan of said TV camera means corresponding to a selected image;

said selection means being responsive to said vertical framing signals to cause the recording of a single frame of video signals on a continuous loop track of said recording means; and means for processing video signals including said recorded video signal comprising means for reproducing said selected X-ray image in response to said recorded video signals under the control of said synchronizing signals.

2. The combination of claim 1 wherein:

said scanning means operative to provide real time video signals corresponding to radiation images other than said selected image;

said means for processing includes;

comparing means operative to compare said recorded video signals corresponding to said selected image with said real time video signals corresponding to other images and to provide comparison video signals in response thereto; and means for reproducing said comparison video signals under the control of said synchronizing signals.

3. The combination of claim 1 wherein:

said scanning means operative to provide real time video signals corresponding to X-ray images other than said selected X-ray image;

said means for processing includes:

comparing means operative to compare said recorded video signals corresponding to said selected X-ray image with said real time video signals corresponding to other X-ray images and to provide comparison video signals in response thereto; and means for reproducing said comparison video signals under the control of said synchronizing signals.

4. The combination of claim 3 wherein:

said scanning means includes television camera means;

said recording means includes a continuous loop magnetic media with each of said tracks comprising a separate continuous loop;

said sync signals include vertical and horizontal synchronizing signals for controlling the vertical field and horizontal line scanning rates, respectively, of said television camera means;

said predetermined quantity of video signals comprising a a predetermined number of vertical fields of scan of said TV camera means, with said predetermined number of fields recorded to be compared with the predetermined number of real times.

5. The combination of claim 3 wherein:

said comparing means operative to compare said recorded video signals and said real time video signals in such a manner that the common portions thereof are substantially cancelled so that said comparison video signals include the difference therebetween.

6. The combination of claim 5 wherein:

said comparing means includes difference enhancement means to provide an enhanced gain output in response to said comparison video signals when the common portion of said recorded and real time video signals are substantially optimally cancelled.

7. The combination of claim 6 wherein:

said image enhancement means includes;

first and second potentiometers each having a variable tap thereon which are mechanically ganged together;

said first potentiometer receiving said record and real time video signals at opposite ends thereof, with one of these signals being inverted with respect to the other so that the signals are compared to provide said comparison signals at the tap of said first potentiometer;

means for applying said comparison signals to a circuit point on said second potentiometer;

said second potentiometer having its ends commonly connected;

an impedance element coupled between said common end connection of said second potentiometer and a reference potential; and said first and second potentiometers and said impedance elements being so selected that said second potentiometer provides a substantially highest gain output at the tap thereof when the tap of said first potentiometer is set at a point thereon where there is substantially optimum cancellation of the common portions of said recorded and real time video signals.

8. The combination of claim 3 wherein:

said recorded video signals corresponding to said selected X-ray image taken at a first X-ray energy level by said X-ray generating means and includes:

means for providing said other X-ray images at a second energy level to provide real time video signals corresponding thereto so that said comparing means is operative to compare said recorded video signals at said first energy level with said real time video signals at said second level.

9. The combination of claim 3 including:

auxiliary recording means for recording said comparison signals under the control of said synchronizing signals.

10. The combination of claim 3 wherein:

said recorded video signals corresponding to said selected X-ray image taken at a first X-ray energy level by said X-ray generating means and includes:

means for providing said other X-ray images at a second energy level to provide real time video signals corresponding thereto so that said comparing means is operative to compare said recorded video signals at said first energy level with said real time video signals at said second level;

said selection means is operative to cause said video signals corresponding to a selected X-ray image to be recorded on said recording means and to be sequentially replaced with subsequent video signals corresponding to subsequent X-ray image at a predetermined rate;

said X-ray generator means being deactivated during the time interval between the recording times; and said recorded video signals being reproduced by said reproducing means during the time interval between recording times.

11. The combination of claim 1 includes:

means for prohibiting said X-ray generating means from being deenergized until said predetermined quantity of video signals is recorded on said recording means.

12. The combination of claim 1 wherein:

said selection means is operative to cause said video signals corresponding to a selected X-ray image to be recorded on said recording means and to be sequentially replaced with subsequent video signals corresponding to subsequent X-ray image at a predetermined rate;

said X-ray generator means being deactivated during the time interval between the recording times; and said recorded video signals being reproduced by said reproducing means during the time interval between recording times.

13. The combination of claim 1 wherein:

said selection means operative to cause a frame of video signals to be recorded on said recording means and to be sequentially replaced by subsequent selected frames at a predetermined rate;

said X-ray generator means being deactivated between the times that said video signals are not being recorded; and said reproducing means operative to reproduce said recorded video signals during the time intervals between recording of subsequent selected frames thereof.